W. B. WATKINS.
Automatic Fire Alarm Telegraph.

4 Sheets—Sheet 1.

No. 111,411.

Patented Jan. 31, 1871.

Witnesses.

William B. Watkins, Inventor.
By his Attorneys,

W. B. WATKINS.
Automatic Fire Alarm Telegraph.

No. 111,411. 4 Sheets—Sheet 2.

Patented Jan. 31, 1871.

Witnesses
Henry A. Mygatt

William B. Watkins, Inventor.
By his Attorneys,
Hopperman & Johnson

W. B. WATKINS.
Automatic Fire Alarm Telegraph.

No. 111,411.

4 Sheets—Sheet 3.

Patented Jan. 31, 1871.

Witnesses:

William B. Watkins, Inventor.
By his Attorneys,

W. B. WATKINS.
Automatic Fire Alarm Telegraph.

No. 111,411. Patented Jan. 31, 1871.

Witnesses.

William B. Watkins, Inventor.
By his Attorneys,
Opperman & Johnson

UNITED STATES PATENT OFFICE.

WILLIAM B. WATKINS, OF JERSEY CITY, NEW JERSEY.

IMPROVEMENT IN FIRE-ALARM TELEGRAPHS.

Specification forming part of Letters Patent No. 111,411, dated January 31, 1871.

CASE C.

*To all whom it may concern:*

Be it known that I, WILLIAM B. WATKINS, of Jersey City, in the county of Hudson and State of New Jersey, have invented a new and useful Improvement in Automatic Fire-Alarm Telegraphs; and I do hereby declare that the following is a full, clear, and exact description of the construction and operation thereof, which will enable those skilled in the art to make and use my invention, reference being had to the accompanying drawings, which make part of this specification, and in which—

Figure 1:
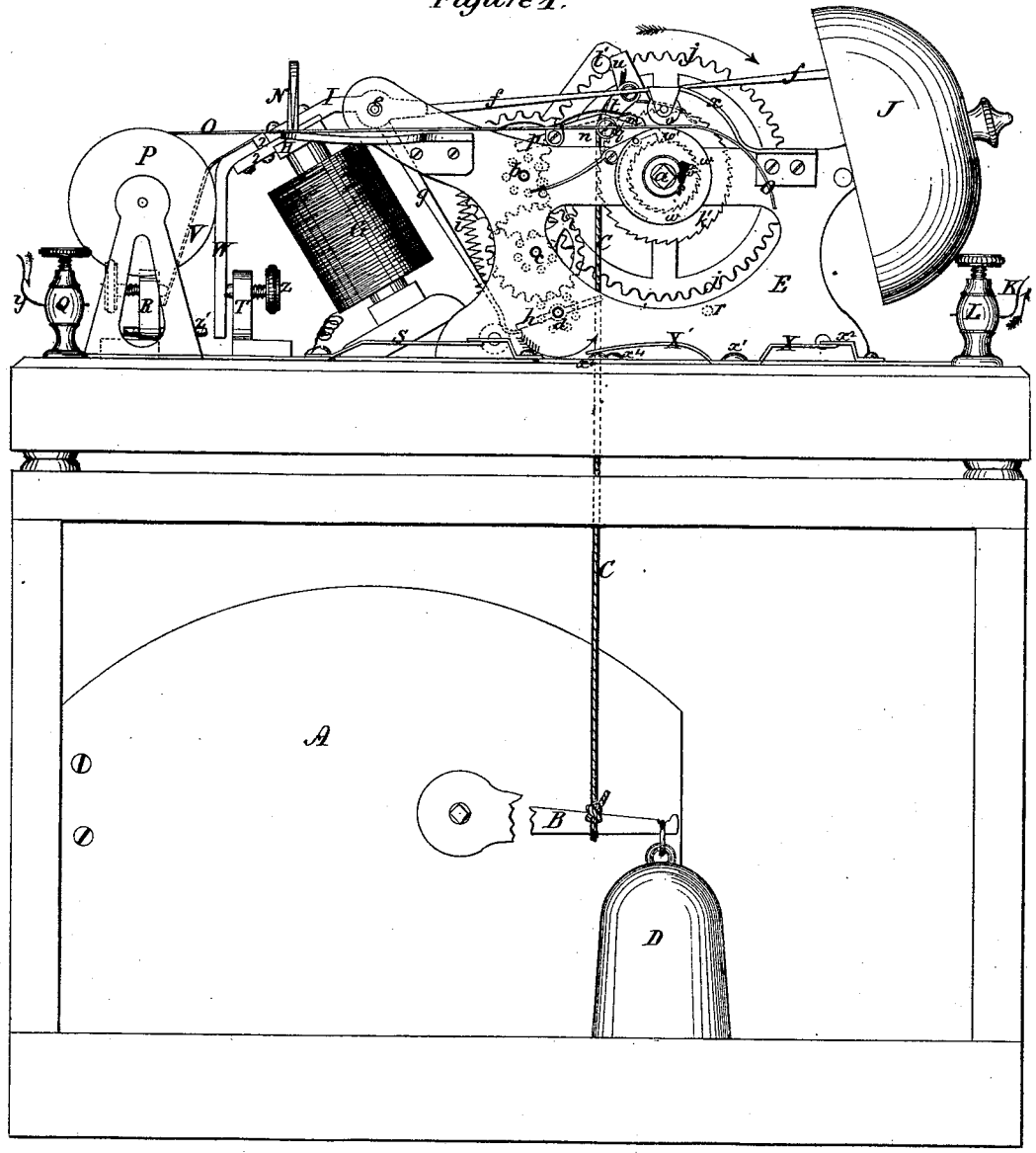
Figure 2:
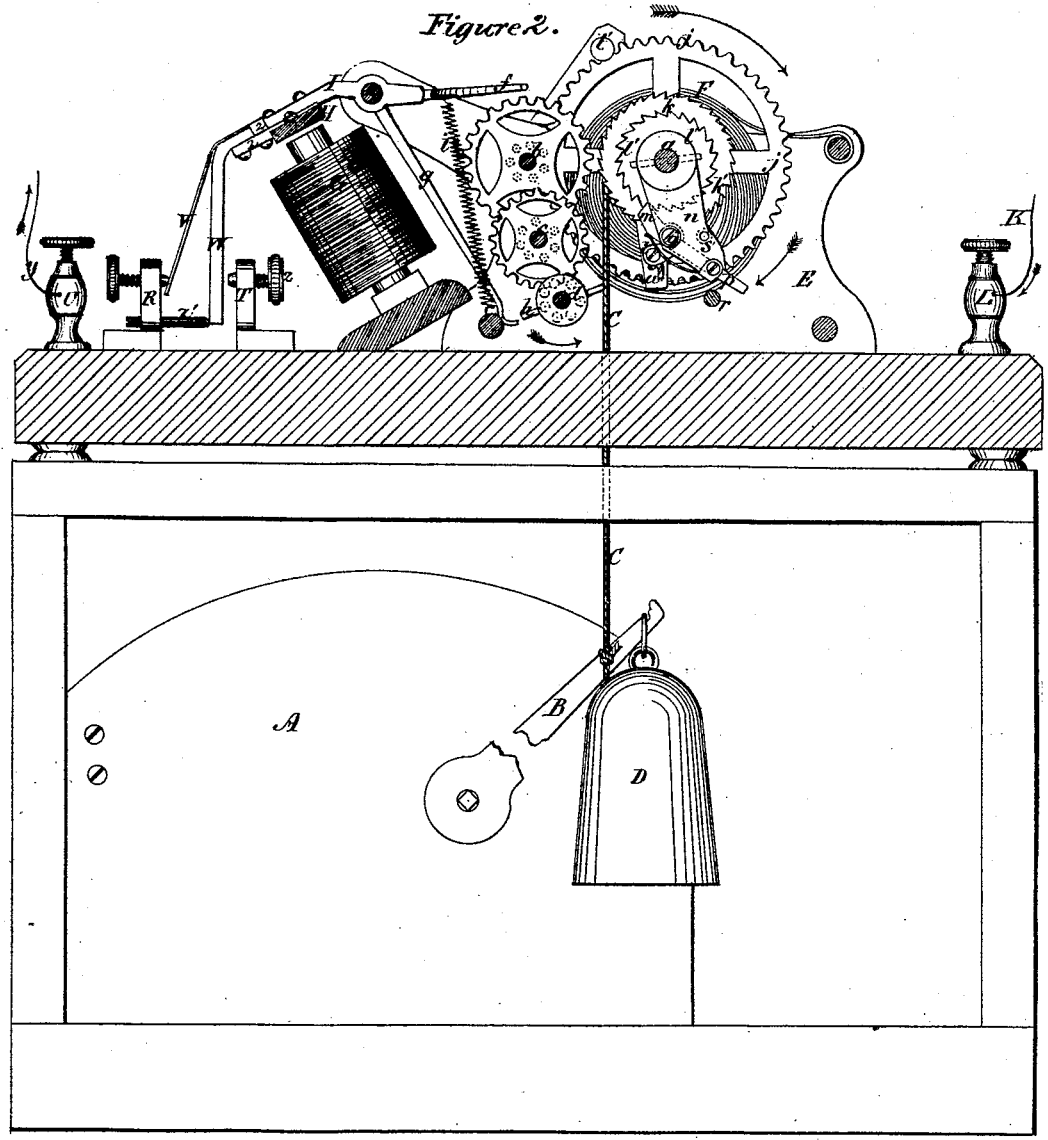
Figure 3:
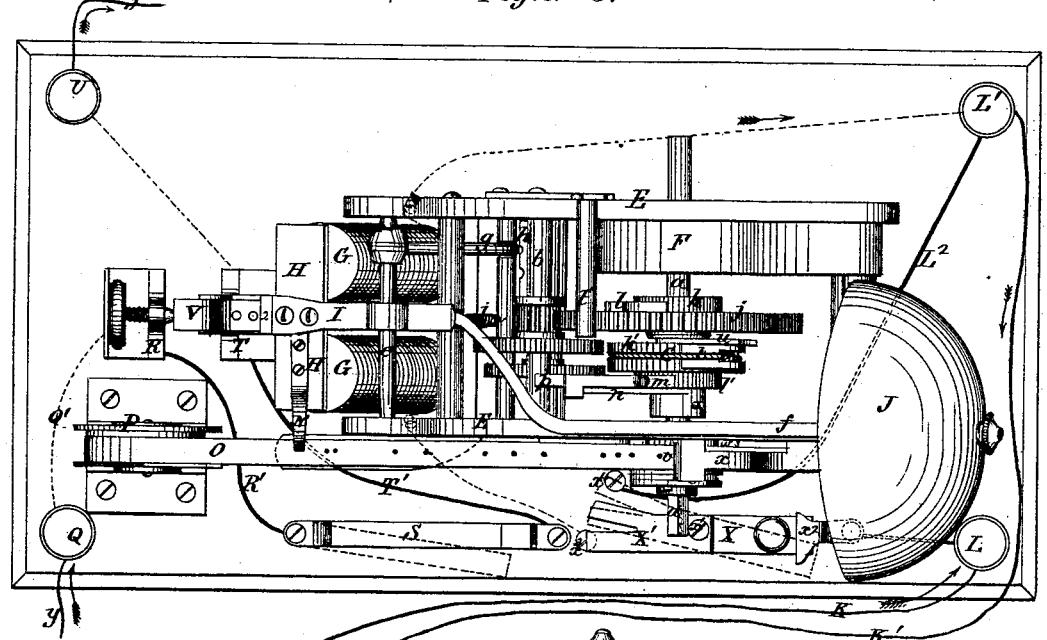
Figure 4:
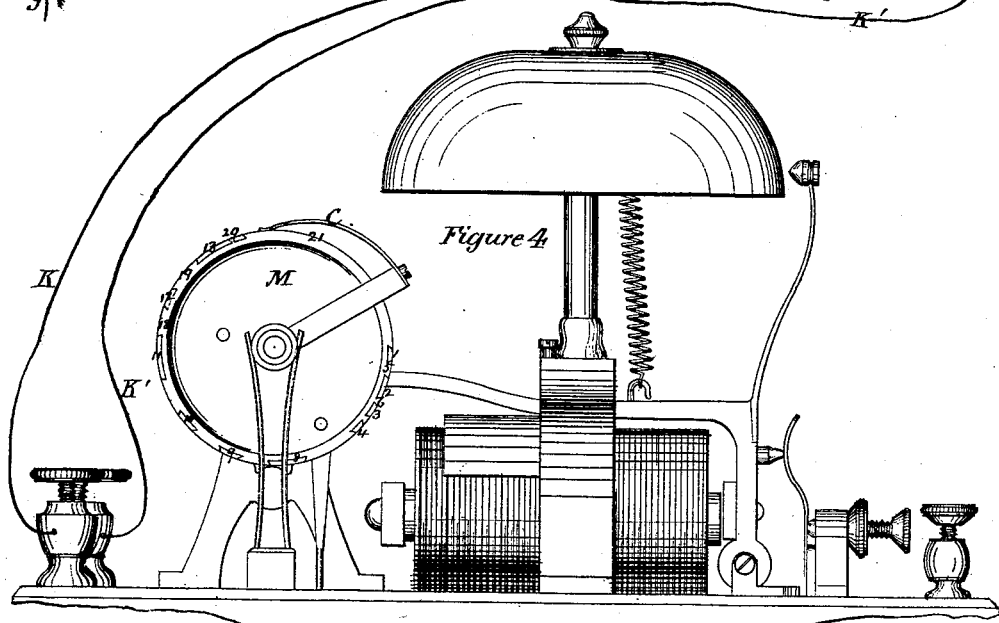
Figure 5:
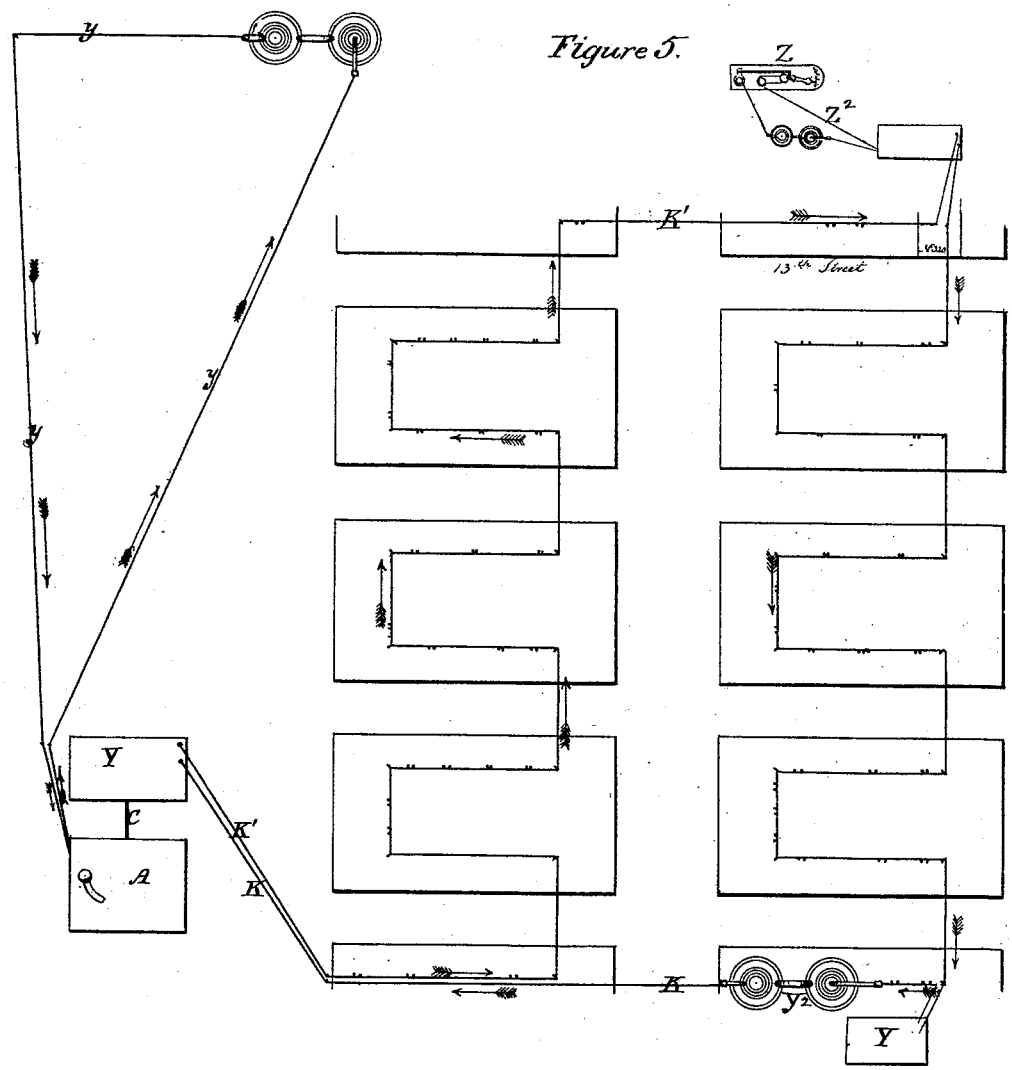

Figure 1, Sheet No. 1, represents an elevation of an ordinary fire-alarm box with my improvement for working said box automatically, the several parts of the mechanism being adjusted and in the position required when the weighted lever of the alarm-box is ready to be pulled up. Fig. 2, Sheet No. 2, represents a vertical longitudinal section of the same, the several parts being in the positions they occupy when the operating-lever is nearly wound up and ready to be automatically tripped. Fig. 3 represents a top view of the mechanism by which the municipal alarm-box is automatically operated. Fig. 4 represents an elevation of the apparatus, having line-connections with and operating the mechanism shown in Fig. 3; and Fig. 5 represents a diagram of the lines and their connections with the buildings, and their separate alarm-boxes.

For the purpose of distinguishing between my improved system of automatic alarm-lines and those systems now in use, I shall denominate the existing lines as municipal lines.

The object of this branch of my invention is to dispense with the necessity of an operator, heretofore required to set in motion the alarm-works within the boxes, to give the alarm through the municipal lines.

My invention consists in the employment of suitable mechanism, in connection with a line or lines worked automatically by means of the fire itself, for setting in motion the works within the fire-alarm boxes of any municipal line or lines, thereby dispensing with the necessity of requiring this to be done by an operator before the alarm can be communicated through the lines. My invention also consists in the construction of an apparatus or mechanism employed to accomplish the above result. My invention further consists in constructing said apparatus or mechanism so that, when operated, it will give the regular alarm or number of the box, through the municipal line, and at the same time sound the number of the street and number of the building therein, at said box, so as to indicate the location of the fire before it can be seen from without. My invention further consists in combining, with a mechanism or apparatus to set in motion the works of the municipal boxes of a fire-alarm, a means for indicating, by printing, either by letters or characters, the number of the street and building, or either, where the fire has originated, at the same time that such number or numbers are sounded, so that each box is made to produce a record not only of the number of alarms struck therefrom, but also of the number of the street and building from which the alarm came. My invention further consists in providing means for repeating automatically, through the municipal lines, the alarm given by the fire itself through my automatic lines, thereby directing the officers of the fire-department to the street and the building on fire, before it can be seen from without, and without operating the municipal fire-alarm boxes. My invention further relates to the construction and use of a switch-key for telegraphing through either line, and for connecting with or disconnecting either line from the operating mechanism.

In Figs. 1 and 2 of the accompanying drawings my improved mechanism is represented as combined with a municipal fire-alarm box, which may be constructed in the manner of those now in use, and operated by a lever or any other suitable means, to set the works in motion. In the example represented in the drawings, the alarm-box A is constructed with a lever, B, which is connected to the mechanism by a cord, C, for the purpose of pulling up a weight, D, attached to the lever B as a means of setting the works in motion; but this may be accomplished by using a lever for winding up a spring, thus dispensing with the weight. The mechanism employed to automatically operate the lever B of the alarm-box consists of a frame, E, of any suitable construction, within and upon which the several parts are arranged and supported. Within the frame E a train of gear-wheels is arranged upon shafts $a\ b\ c\ d$, so that the wheels of each will match the one with the other, and be operated by a spring, F, or a weight, attached to the main shaft $a$, which also carries the winding and tripping devices.

At one end of the frame E a magnet, G, is arranged, so as to attract the armature H carried by a lever, I, having its fulcrum $e$ in the frame. This lever carries at one end an arm, $f$, for striking a bell, J, so as to sound whatever signal may be passing through the automatic line. From the fulcrum $e$ of the lever I an arm, $g$, extends, so as to interlock with and hold a fly, $h$, on the shaft $d$, for the purpose of releasing and stopping the train of wheels by the movements of the armature H as the electric current which operates the same is broken and closed. The movement of the train of wheels is arrested by the arm $g$ when the armature is attracted by the magnet, and the train is again released when the electric circuit is broken by means of the action of a spiral spring, $i$, which pulls away the armature and the locking-arm $g$ at the same time. The movement of the armature H controls that of the arm $g$, and the former is controlled by an arm, W, arranged to vibrate between two adjusting-screws, $zz'$, of the metallic standards R and T, and thus insure the working of the armature by the magnet. A gear-wheel, $j$, is fitted to turn loosely on the shaft $a$, and is made to turn to give motion to the train by a ratchet-wheel, $k$, fixed to said shaft, and locked to the gear-wheel $j$ by a pawl, $l$, Fig. 3.

The devices for pulling up the lever B consist of a grooved ratchet-wheel, $k'$, turning loosely on said shaft. To this ratchet-wheel $k'$ another ratchet-wheel, $l'$, is attached, and turns with it, into which engages the pawl $m$ of an arm, $n$, fixed to, and turning with, the main shaft. The pawl $m$ has an arm, $p$, which extends back of its fulcrum $q$, and forms, in connection with a stop, $b$, the means for limiting the winding up of the spring. This arm $p$ also serves, in connection with stops $r$ and $s$, Fig. 2, as the means of arresting the unwinding of the spring, and of releasing the pawl $m$ from the ratchet $l'$, for the purpose of allowing the weighted lever B of the alarm-box to descend, and to carry back by means of the cord C a pawl, $t$, which engages with the ratchet $k'$ until the arm $u$, which carries said pawl, strikes a stop, $t'$, and thus leaves the mechanism ready to be again wound up. For this purpose the arm $u$ turns with the ratchet-wheel $k'$, with which its pawl $t$ engages, and the arm $n$ turns with its shaft. The main-spring F is attached to the shaft $a$, and is wound up by it in any suitable manner to operate the train. The cord C may be wound and unwound within the groove of the ratchet $k'$, as represented, or by a pulley or other device, and the ratchet-teeth for engaging the pawl $t$ may be arranged on the side of the wheel, or in any other suitable way.

I have described the mechanism which forms the operating connecting-link between the alarm-box A of the municipal line, and my system of lines operated automatically by the fire. It remains to describe the connections of the said lines, and the operation thereof with said mechanism.

In an application for a patent bearing even date herewith I have described my new system of lines which enter and leave the buildings, and are connected within the latter with a break-circuit set in motion by a heat-detecter, Z, and apparatus for working said lines automatically by means of the fire itself, so as to indicate or sound or signal the number of the street and building, or the latter only where the fire has commenced to burn, to as many points as may be desired within said lines. This system of lines is represented in Fig. 5, Sheet No. 4, as connected to the apparatus which forms the subject of this patent in the following manner: The automatic fire-alarm telegraph-line K K', Figs. 4 and 5, from the building with which it connects forms a connection with the apparatus by entering at screw-post L, Fig. 3, passing through the coils of the magnet G, and leaving the apparatus at the screw-post L' in the direction of the arrows to other points.

The line described connects with the stationary break-plate M, Fig. 4, or revolving break-circuit when used in the different buildings with which the line connects.

The construction and operation of the break-circuit have been fully described in my application above mentioned, and in the example there shown said break-circuit is constructed to indicate or sound an alarm from street No. 13, and building No. 320 in said street. At the commencement of a fire in said building the electric current in the line K K' will be broken and closed at intervals corresponding to the fixed break plate or wheel M, Fig. 4, Sheet 3, so as to cause the magnet G to release and attract the armature H, and cause the bell J to be struck, and sound the alarm of the said street No. 13 and building No. 320 as long as the local circuit $Z^2$ in the building, closed by the heat-detecter, is unbroken.

Should no fire occur in a building the electric circuit of the line K and K' will be closed, and the armature H will be attracted by the magnet G, which will cause the arm $g$ to catch the fly $h$, and thus lock the wound-up train, the ratchet-pawls $m$ and $t$ and the arms $n$ and $u$ being shown in such positions in Fig. 1.

As the armature is released at intervals by the break-circuits, when operated by the fire in the building, so as to strike the proper number, the train will also be released at intervals, and cause the arm $n$, which is fastened to the shaft $a$, to turn with it, and, by means of its pawl $m$, turn the ratchet-wheels $l'$ and $k'$, which winds the cord C, and thus pulls up the weighted lever.

The motion is produced by the unwinding of the spring F, whose force must be greater than the resistance to be overcome. When the arm *p* of the pawl *m* arrives at and comes in contact with the stop *r*, it will be turned upon its fulcrum *q*, and held by the stop *s*, so as to release the pawl *m* from the ratchet *l'*, and allow the ratchet-wheels *k' l'* to turn on their shaft, and, consequently, the weighted lever to descend and operate the municipal alarm-box A, in a manner well understood by those skilled in the art. As soon as the weighted lever B has reached the limit of its descent the arm *u*, to which the cord C is fastened, will be arrested by the stop *t'*, and held in that position, as shown in Fig. 1.

The alarm having thus been automatically conveyed through the municipal line by means of the fire itself causing the bells in the said line to strike the number of the box which the foregoing mechanism has set in motion, and the firemen, having by that means been brought to said box A, the firemen will be at once apprised of the exact street and number of the building from which the alarm comes by the distinct striking of the number or numbers of each upon the bell J, so as to be heard, and thus be directed to the very spot without delay, and long before the fire could be seen from without.

It will be observed that the direct and only connection between the automatic alarm apparatus and the alarm-box A of the municipal line is the cord C, as shown in Figs. 1, 2, and 5, which connects with the lever B of said box, and therefore no metallic connection is possible between the two lines to produce any derangement of either, while at the same time the alarm can be given from the municipal fire-alarm box A by any person, in the ordinary way, without interfering with the adjustment and working of my automatic line.

The alarm-boxes now in use are only brought into operation by the person who discovers the fire, and then makes his way to the nearest box, and, after finding the key, opens the box and sets the works in motion, which gives the alarm in the usual way by striking the number of the box. This alarm is repeated until the lever B runs down.

It is advantageous to distinguish between this alarm and that produced from the same box by the fire itself through my automatic line, and for this purpose the mechanism may be adjusted by changing the position of the stop *r*, or changing the fastening-point of the cord C, so as to cause the alarm from the same box to be sounded a less number of times; and from this distinction it is apparent the officers and firemen will at once be informed of the extent of the fire, as the alarm from my automatic line will indicate that the fire has just begun.

The alarm given through my automatic line by the mechanism described will be indicated by sound or signal. In order, however, to extend the capacity of my automatic line to indicate the alarm, I have combined therewith a mechanism for printing the number or numbers simultaneously with and corresponding to those being sounded. The mechanism by which this is accomplished is shown in Figs. 1 and 3, and consists of a marking, printing, or indenting device, N, carried and operated by the armature at intervals corresponding with those of the number sounded, in such manner that the impressions or marks of the printing device will be made upon a moving strip of paper, O, and indicate thereon a record of the number sounded.

The strip of paper O is wound on a reel, P, and supported beneath the printing device N, in any suitable manner, for receiving the impressions, and passes between feeding-rolls *v w*, one of which, *w*, is fitted to turn loosely in a forward direction only upon the main shaft *a*. This forward motion of the roll *w* is derived from the turning of the shaft, and continues during the unwinding of the spring F, while the signal is being sounded. For this purpose a small ratchet-wheel, $w^2$, is fastened to the side of the roll *w*, into which takes a pawl, $w^1$, fixed to a disk or arm, which turns with the shaft and carries the roll forward.

To prevent the roll *w* from turning back during the winding of the spring F, to reset the instrument, a pawl fixed to the frame takes into a ratchet-wheel, $w^3$, fastened on the inner side of said roll *w*, and thus, while stopping any backward movement, allows it to turn forward. The roll *v* is carried by a spring-arm, *x*, so as to clamp the paper upon the feeding-roll.

The printing the number of the street and the number of the building, or the latter only, so as to be read as such, is effected by the peculiar arrangement and construction of the breaks in the break-circuit M, shown in Fig. 4 of the drawings.

As I have fully described the construction and operation of the break-circuit to produce an alarm or signal in a separate application, bearing even date herewith, it is deemed unnecessary to repeat such full description here further than to illustrate the application of said break-circuit to the recording of the alarm.

The mechanism shown in Fig. 4, Sheet 3, represents the break-circuit as applied to and operated by an electro-magnetic motor, and said break-circuit is formed by breaks upon a fixed plate, M, around which a spring-arm, C, is made to travel by the operation of said motor. The breaks are arranged in the circuit in two divisions, and those of each division are of unequal length, so as to cause the printing device N to act at unequal intervals.

The first division of breaks will produce impressions upon the paper at short intervals, and the second at longer intervals, so as to separate and distinguish the numbers of the two divisions.

In the drawings, Sheet No. 3, Fig. 4, the break-circuit M is constructed to indicate 13 as the number of the street, and 320 as the number of the building. To produce these numbers on paper, by means of a printing device worked by the armature H, Fig. 3, the four breaks 1 2 3 4 are arranged so that while the spring-arm C is passing over break 1 the circuit will be broken, the armature H released, as shown in Fig. 2, and the gearing-train will carry forward the paper beneath the printing device N, until the spring C strikes the metallic interval 5, when the circuit will be closed, and the armature H again attracted, bringing the printing-arm N upon the paper, and thus making the first impression. While the spring-arm C passes over break 2, the train will again carry the paper forward, until said arm again closes the circuit by contact with the metallic interval 6, and in the same manner the circuit is opened and closed by the other breaks; but as the break 2 is twice as long as the others, 3 and 4, it will increase the space between the first and second impressions, and make the number 13, (thus, .   . . .,) indicating the street. The break 8 is longer than those just described, and allows the paper to be carried forward a still greater distance, which makes an interval on the paper that separates the number thus formed from that of the building which follows. This building-number is indicated by 320, and is formed upon the paper at longer intervals than the street-number, and for this purpose the breaks 9 and 10 are shorter than break 8, and longer than breaks 3 and 4, while the break 11 is greater than 9 and 10, to allow the paper to be carried forward, so as to separate the impressions indicating 3 from those which are to indicate 2, the latter being formed by metallic interval 18, and break 12, and metallic interval 19. The break 13 is of the same length as break 11, and allows the paper to be carried forward so as to separate the impressions for cypher which follow those for number 2. The cypher is made by closing the circuit at interval 20, and by means of the short break 14 and metallic interval 21, so as as to make two impressions close together. The paper, therefore, will exhibit a permanent record at all times, not only of the number of alarms given, but of the number of the street and building, as illustrated at Fig. 3 of the drawings.

A printing device thus operated will indicate the location of the fire without a general alarm, as well as the location of any derangement of the lines from other causes than fire in a building.

In the event of any derangement occurring in the train of gearing or mechanism herein described for operating the municipal alarm-box automatically, the alarm can still be conveyed by my improved system of automatic lines through the municipal line. To accomplish this the municipal line is connected with the mechanism shown in Fig. 3 by the screw-post Q, so that the electric current will pass through the wire Q' to the standard R, and by the wire R' to the switch-key S, and thence to the standard T by the wire T', and from the standard T to the screw-post U, and off through the line. In this connection the switch-key S is closed, as shown in Fig. 3 of the drawings, and the electric circuit of the municipal line $y$ passes through these connections undisturbed. When, however, such derangement occurs the alarm is conveyed directly through the municipal line without setting in motion the mechanism of the municipal boxes, by simply opening the switch-key S, as shown by dotted lines in Fig. 3, which, when the armature is attached, diverts the electric current of the municipal line from the standard R through the metallic spring V, and through the vibrating metallic arm W of the armature, as shown in Fig. 1. The metallic spring V is attached to the arm W, and its lower end is constantly in metallic connection with the standard R, for the purpose of adapting the apparatus to be used in repeating the alarm through the municipal line. This arm W is insulated at 2 from the mechanism, so as to convey the electric circuit directly to the standard T, and thence by the screw-post U through the line.

From the connections thus described it will be seen that when the alarm is being sounded through my automatic line by means of the fire, the same alarm will be repeated through the municipal line by the movements of the armature H, which closes the circuit of said line by bringing the arm W in contact with the stop-screw $z$, and opens said circuit when the armature is released, and the arm W is pulled away from the stop-screw $z$ by the force of the spiral spring $i$. The switch S, thus arranged and operating, can be used also for telegraphing through the municipal line in the ordinary way.

I have described and represented certain devices for repeating the alarm through the municipal line, but I do not confine myself to these, as it is evident that the magnet G can be made to operate any relay or repeater that may be preferred.

If from any cause it should become necessary to remove the train of gearing and magnet from the frame the electric current through my automatic line may still be kept closed by the use of a switch-key, X, secured by a pivot, $x^1$, on which it may be turned, as shown by dotted lines in Fig. 3, in which position the current will pass from the screw-post L through the fixed plate $x^2$, which always connects with the switch-key X, thence from the button $x^4$ of the switch-key X to the screw-post $L^1$, by the connecting wire $L^2$. When the switch is in connection with the button $x^3$, as shown in Fig. 3, the circuit passes through the magnet. Both ends of this switch are made to spring, one end, X, being made to spring up against the fixed plate $x^2$ at all times, and the other, X', to press upon the metallic buttons $x^3$ and $x^4$.

The mechanism for pulling up the lever of the municipal alarm-boxes should be kept in suitable boxes under lock and key for their prorection, and the works and the lines connecting with the same should be further protected by the use of lightning-arresters, connecting with the lines in the usual manner.

A duplicate of the automatic mechanism herein described should be placed in the room where the battery $Y^2$ of the automatic line is kept, and connected with it, as seen at Y, Fig. 5, Sheet 4, so that the person in charge will be informed, by its operation, of the alarms given at the municipal boxes by means of the fire, and also have a record of the same.

The wires of my automatic line K K', connecting with the boxes on buildings or on telegraph-poles, should also run through pipes at such places for their protection. The cord C, connecting with the municipal alarm-box, should be protected in a similar manner.

When the municipal alarm-boxes are constructed as those now in use in New York city, so as to require the operating-lever to be pulled down instead of up, the cord C may run over a pulley placed beneath the lever, or the box y, containing the automatic mechanism herein described, may be placed beneath the municipal box, and the cord be made to pull down instead of up.

In cities where the municipal alarm boxes are operated by turning a crank or key a number of times, my automatic mechanism may be made to operate such boxes by winding the cord C around a pulley or grooved wheel in any suitable manner, so that when the cord C is pulled the wheel will cause the operating-shaft of the municipal box to turn.

Having described my invention, I claim—

1. The method of operating the lever B, or other device for setting in motion the mechanism of a municipal fire-alarm box, A, by the interposition of mechanism depending for its action upon the fire, as described.

2. The method of bringing the lever B, or other device of a municipal fire-alarm box, A, in a position to work the mechanism of said alarm-box, by means of a cord, C, or other device connected to an arm or wheel, k', which operates, when the gearing-train is released, so as to bring the lever B in the desired position, as described.

3. In combination with a mechanism for bringing the lever B, or other device, of a municipal fire-alarm box in a position to work said alarm-box, an arm or wheel, n, fixed to and turning with the main shaft a, and operated by a spring, F, or weight on said shaft, in connection with stops r and s, so as to automatically trip and release the mechanism, and set the lever free to work the alarm-box, as herein described.

4. In a mechanism for operating the lever B, or its equivalent, of a municipal fire-alarm box, the method of arresting the movement of said lever in giving the alarm by means of a stop, t', or its equivalent, and thus maintain the mechanism in position to again operate said lever, as described.

5. In a mechanism for operating the lever B, or its equivalent, of a municipal fire-alarm box automatically by the fire, the arm p of the ratchet-pawl m arranged and operating in connection with a stop, b, to limit the winding up of the mainspring F in setting the mechanism, as described.

6. The combination of the arm n, or its equivalent, fixed to and carried by the shaft a and pawl m, which it carries, with the ratchet-wheels l' and k', for pulling up the cord C for automatically operating the lever B, as described.

7. The ratchet-wheels l' and k', pawl t, and arm u, made to move loosely on their shaft a, to allow the cord C to unwind during the descent of the operating-lever B, as described.

8. The combination of the magnet G, armature H, spring i, and locking-arm g, when operated by the fire itself, for the purpose of arresting and releasing suitable gearing-train, and mechanism operated thereby, so as to operate the municipal fire-alarm boxes automatically, as described.

9. In combination with mechanism for operating the municipal fire-alarm boxes, as described, by means of the fire itself, an alarm-bell, J, or signal apparatus, for the purpose of indicating at the boxes the number of the street and building, or the latter only, from whence the alarm comes.

10. In combination with a mechanism for operating the municipal fire-alarm boxes, as described, by means of the fire itself, suitable devices operated by said mechanism for printing or recording the number of the street and the number of the building, or the latter only, simultaneously with the sounding of the alarm.

11. In combination with a printing device, N, operated by the movements of the armature H, the feeding-rolls v and w operated by the motion of the main shaft a, so as to produce the proper feed of the paper, as described, when the said shaft a is set in motion by the action of the fire, as described.

12. The feeding-roll w of the printing mechanism, arranged upon its shaft a, so that it will be carried forward with the forward motion of the shaft to feed the paper by means of ratchet $w^2$ and pawl $w^1$, and prevented from turning with said shaft a in winding up the spring, as described.

13. In combination with a printing device, N, for recording the number of the street and the number of the building, or the latter only, the break-circuit M, having metallic intervals and its breaks of unequal length, arranged so as to operate said printing device and feed the paper so as to produce impressions at intervals, which will indicate the signal or numbers sounded.

14. A repeater or relay, or their equivalents, for sounding or indicating the numbers of streets and buildings, or the latter only, or any given signal through an independent telegraph-line, when such repeater or relay is actuated automatically, as described.

15. In combination with a mechanism set in motion by the fire itself to operate the municipal fire-alarm boxes, the spring V, arranged so as to maintain a constant connection with the standard R for the purpose of repeating, through the municipal lines by means of the metallic arm W and standards T, the alarm caused by the fire and sounded and recorded at the box by the mechanism herein described.

16. The switch-key S, for the purpose of connecting the municipal line with the mechanism described, so that the electric circuit of said line will remain closed when the switch is closed, and by opening the said switch allow the alarm to be repeated through the said municipal line by the movements of the armature in operating the arm W, as described.

17. The spring-switch S, located and arranged, in connection with the mechanism described, for the purpose of being used as a key for telegraphing through the municipal line, as described.

18. The double spring-switch X X', arranged so as to be connected and disconnected with either of the metallic buttons $x^3$ $x^4$, for the purpose of cutting off the electric circuit from the magnet G, and restoring it when desired, in either case keeping the electric circuit closed, and in either position to be used, when desired, as a key for telegraphing.

19. A train of wheels operated by a spring, F, or a weight, and the pulling up and tripping mechanism connected therewith, and operated thereby, as described, for setting in motion a second force, as described.

20. The combination of a heat-detecter, or local fire-alarm, Z, local circuit $Z^2$, the break-circuit M, street-line K K', and alarm apparatus Y Y, with the municipal line and its boxes, the whole operating as herein described.

In testimony whereof I have hereto set my hand.

WILLIAM B. WATKINS.

Witnesses:
  A. E. H. JOHNSON,
  T. H. UPPERMAN.